Patented Oct. 6, 1953

2,654,780

UNITED STATES PATENT OFFICE 2,654,780

TETRAALKYLDIAMIDOPHOSPHORYL PHOSPHORIC DICHLORIDES

Henry Tolkmith, Midland, Mich., assignor to The Dow Chemical Company, Midland, Mich., a corporation of Delaware No Drawing. Application August 17, 1951,
Serial No. 242,405

5 Claims. (Cl. 260—543)

The present invention is concerned with certain new and useful phosphate compounds and a novel method for their production.

These new compounds are tetraalkyldiamidophosphoryl phosphoric dichlorides of the formula:

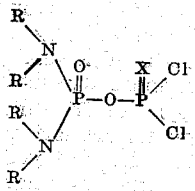

In this and succeeding formulas, X represents a chalcogen, i. e. oxygen or sulfur, and each R represents an alkyl radical containing from 1 to 4 carbon atoms, inclusive.

The tetraalkyldiamidophosphoryl phosphoric dichlorides are oily liquids, somewhat soluble in many organic solvents and water. They are of value as intermediates for the preparation of more complex phosphate derivatives. Their use as intermediates for the production of certain valuable parasiticides is disclosed in my copending application Serial No. 242,410, filed concurrently herewith.

The new compounds may be prepared by mixing or blending a phosphorus chalcogen chloride, i. e. phosphorus oxychloride (POCl₃) or phosphorus thiochloride (PSCl₃) with an O-alkyl tetraalkyldiamidophosphate of the formula

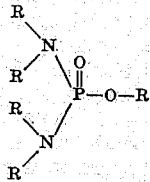

The mixture is then heated to a temperature of from 60° and 110° C. whereby by-product alkyl chloride of reaction is evolved (RCl), the heating being continued until the evolution of alkyl chloride of reaction is substantially complete.

The reaction appears to involve a condensation reaction resulting in the formation of an alkyl chloride. In the practice of the invention, substantially 0.33 of the chlorine in the phosphorus oxychloride or phosphorus thiochloride may be recovered as an alkyl chloride. The process might be represented as taking place according to either or both of the following equations:

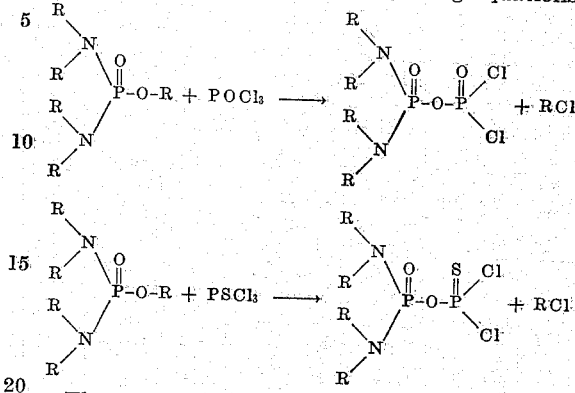

The proportion of at least one mole of phosphorus oxychloride or phosphorus thiochloride per mole of the O-alkyl tetraalkyldiamidophosphate is critical for the accomplishment of the desired reaction, i. e. the synthesis of the tetraalkyldiamidophosphoryl phosphoric dichlorides. In practice, increased yields are obtained when an excess of the phosphorus oxychloride or phosphorus thiochloride reactant is employed. A preferred operation consists in the reaction of from 1 to 6 molecular proportions of the phosphorus chalcogen chloride with each proportion of the O-alkyl tetraalkyldiamidophosphate. A significantly lesser proportion of the phosphorus chalcogen chloride is not desirable since is reduces the yield of the desired tetraalkyldiamidophosphoryl phosphoric dichloride and results in the formation of the other phosphate derivatives.

The reaction between the O-alkyl tetraalkyldiamidophosphate and phosphorus chalcogen chloride proceeds smoothly at the temperature range of from 60° to 110° C. Since the desired products are somewhat unstable at temperatures in excess of 110° C., exposure to such elevated temperatures for any appreciable period of time should be avoided.

The rate at which the reaction takes place has been found to vary directly with the temperature employed. In practice, the reaction is generally carried out over a period of from three to eight hours, or longer, the longer periods of reaction being employed at the lower temperatures.

In carrying out the process, the total reactant charge may be mechanically mixed and then heated for a period of time. Alternatively, the O-alkyl tetraalkyldiamidophosphate may be added portionwise to the phosphorus oxychloride or phosphorus thiochloride under conditions of elevated temperature in the reaction vessel. If desired, the reaction may be carried out in an inert organic solvent such as benzene.

The contacting of the reactants, as above described, may be carried out under any practical operating pressure. Since the alkyl chlorides produced in the process are frequently gases or low boiling liquids, operation under somewhat increased pressure is sometimes preferred in order to avoid the loss of the alkyl chloride by-products. However, where it is desired to recover the by-product as produced, the operation may be carried out at atmospheric or reduced pressure, and such separation and recovery of alkyl chloride as formed constitutes a preferred method of operation.

A potentially valuable mode of operation consists of carrying out the foregoing preparation as a continuous process. Thus, the two reactants may be mixed or otherwise blended and metered through a suitable reaction zone of controlled temperature, at such rate as to accomplish the formation of the desired compound in high yield during the reaction interval. In such operation, any suitable pressure and temperature may be maintained and by-product alkyl chloride bled out of the system as desired.

Following the reaction, any excess phosphorus chalcogen chloride, residual alkyl chloride and reaction solvent may be removed from the reaction mixture by distillation at reduced pressure and under 110° C. to obtain as a residue the desired tetraalkyldiamidophosphoryl phosphoric dichloride.

The following examples illustrate the invention but are not to be construed as limiting:

Example 1

16.6 grams (0.1 mole) of O-methyl tetramethyldiamidophosphate (having a density of 1.0647 and a refractive index $n/D$ of 1.4385 at 20° C.) and 46 grams (0.3 mole) of phosphorus oxychloride were mixed together and the resulting dispersion heated at a temperature of from 85° to 95° C. while driving off by-product methyl chloride and until no further substantial amounts of methyl chloride were liberated. The heating was carried out with stirring and over a period of about 3 hours. Upon completion of the reaction, the mixture was distilled under reduced pressure at temperatures gradually increasing up to a temperature of 100° C. to separate low boiling constituents and to obtain as a residue a tetramethyldiamidophosphoryl phosphoric dichloride product in substantially quantitative yield. The latter is a viscous oil having a refractive index $n/D$ of 1.4669 at 20° C.

Example 2

16.6 grams (0.1 mole) of O-methyl tetramethyldiamidophosphate and 68 grams (0.4 mole) of phosphorus thiochloride were mixed together and the resulting dispersion heated at a temperature of 100° to 110° C. until the evolution of methyl chloride of reaction was substantially complete. The heating was carried out with stirring and over a period of about 5 hours. The mixture was then distilled under reduced pressure at gradually increasing temperatures up to a temperature of 100° C. to separate low boiling constituents and to obtain as a residue a tetramethyldiamidophosphoryl thiophosphoric dichloride product as a viscous oil having a refractive index $n/D$ of 1.5132 at 20° C.

Example 3

18 grams (0.072 mole) of O-methyl, N,N-dimethyl-N',N'-dibutyldiamidophosphate (having a refractive index $n/D$ of 1.4465 at 20° C.) and 44 grams (0.289 mole) of phosphorus oxychloride were mixed together and the resulting dispersion heated at a temperature of from 95° to 100° C. until no further substantial amounts of methyl chloride of reaction were liberated. The heating was carried out with agitation and over a period of about 3.5 hours. Upon completion of the reaction, the mixture was distilled under reduced pressure at gradually increasing temperatures up to a temperature of about 100° C. to separate low boiling constituents and to obtain as a residue an N,N - dimethyl - N',N' - dibutyldiamidophosphoryl phosphoric dichloride product in substantially quantitative yield. The latter product is a viscous oil having a refractive index $n/D$ of 1.4728 at 20° C.

In a similar manner other tetraalkyldiamidophosphoryl phosphoric dichlorides may be prepared as follows:

N,N' - diethyl - N,N' - diisopropyldiamidophosphoryl phosphoric dichloride by reacting together O-butyl N,N'-diethyl-N,N'-diisopropyldiamidophosphate and phosphorus oxychloride.

N,N - diisopropyl - N',N' - dimethyldiamidophosphoryl phosphoric dichloride by reacting together O-ethyl N,N-diisopropyl-N',N'-dimethyldiamidophosphate and phosphorus oxychloride.

N,N' - dibutyl - N,N' - dimethyldiamidophosphoryl thiophosphoric dichloride by reacting together O-methyl N,N'-dibutyl-N,N'-dimethyldiamidophosphate and phosphorus thiochloride.

Tetraethyldiamidophosphoryl thiophosphoric dichloride by reacting together O-propyl tetraethyldiamidophosphate and phosphorus thiochloride.

N,N' - dimethyl - N,N' - diisopropyldiamidophosphoryl thiophosphoric dichloride by reacting together O-methyl N,N'-dimethyl-N,N'-diisopropyldiamidophosphate and phosphorus thiochloride.

Tetraethyldiamidophosphoryl phosphoric dichloride by reacting together O-ethyl tetraethyldiamidophosphate and phosphorus oxychloride.

The O-alkyl tetraalkyldiamidophosphates employed as starting materials, as previously described, may be prepared by reacting a suitable tetraalkyldiamidophosphoric chloride with a suitable sodium alcoholate. Satisfactory yields are obtained when employing the diamidophosphoric chloride and alcoholate in substantially equimolecular proportions. The reaction takes place readily at temperatures of from 30° to 90° C. The reaction is somewhat exothermic, the temperature being controlled by the addition and subtraction of heat, if required. Following the reaction, the crude mixture is filtered and the filtrate fractionally distilled under reduced pressure to separate the desired product.

The diamidophosphoric chlorides employed in the preparation of the O-alkyl tetraalkyldiamidophosphates may be prepared by reacting phosphorus oxychloride with a dialkylamine or successively with two different dialkylamines. The reaction is carried out in a sufficient amount of the amine reactant to act as acceptor for by-product hydrogen chloride. Where it is desired to introduce two identical amido groups into the molecule, 2 molecular proportions of the amine are reacted with each molecular proportion of phosphorus oxychloride. Where it is desired that the substituting amido groups differ, 1 molecular proportion of the amine is first reacted with 1 molecular proportion of phosphorus oxychloride and the resulting intermediate monoamidophosphoric dichloride thereafter reacted with one molecular proportion of the the other amine reactant. The reaction takes place readily at temperatures of from 0° to 40° C. The reaction is somewhat exothermic, the temperature being controlled by the addition and subtraction of heat, if required. Following the reaction, the crude mixture is filtered and the filtrate fractionally distilled under reduced pressure to separate the desired tetraalkyldiamidophosphoric chloride.

I claim:

1. A diamidophosphoryl phosphoric dichloride of the formula

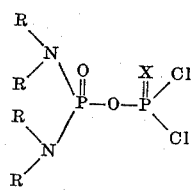

wherein each R represents an alkyl radical containing from 1 to 4 carbon atoms, inclusive, and X represents a member of the group consisting of oxygen and sulfur.

2. Tetramethyldiamidophosphoryl phosphoric dichloride having the formula

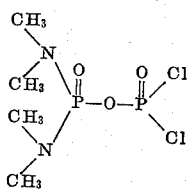

3. Tetramethyldiamidophosphoryl thiophosphoric dichloride having the formula

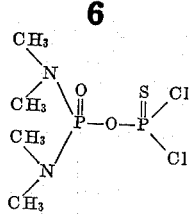

4. N,N - dimethyl - N',N' - dibutyldiamidophosphoryl phosphoric dichloride having the formula

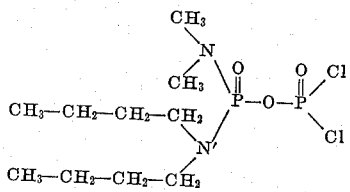

5. A method which comprises (1) admixing at least one molecular proportion of a phosphorus chalcogen chloride with one molecular portion of an O-alkyl tetraalkyldiamidophosphate of the formula

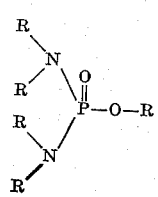

wherein each R is an alkyl radical containing from 1 to 4 carbon atoms, inclusive, and (2) heating said mixture at a temperature of from 60° to 110° C. until the evolution of alkyl chloride of reaction is substantially complete, to produce a diamidophosphoryl phosphoric dichloride of the formula

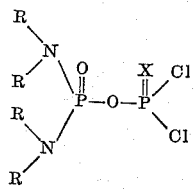

wherein X represents a chalcogen and R is as defined above.

HENRY TOLKMITH.

No references cited.